United States Patent
Wagner et al.

(10) Patent No.: US 12,007,736 B2
(45) Date of Patent: Jun. 11, 2024

(54) COMMUNICATION SYSTEM FOR AUTOMATION AND PROCESS ENGINEERING, AND Y SELECTOR SWITCH UNIT FOR SUCH A COMMUNICATION SYSTEM

(71) Applicant: IFM ELECTRONIC GMBH, Essen (DE)

(72) Inventors: Alfred Wagner, Bodnegg (DE); Andres Glöckner, Wildau (DE); Michael Kimmich, Tettnang (DE)

(73) Assignee: IFM ELECTRONIC GMBH, Essen (DE)

( * ) Notice: Subject to any disclaimer, the term of this patent is extended or adjusted under 35 U.S.C. 154(b) by 740 days.

(21) Appl. No.: 17/046,854

(22) PCT Filed: Apr. 9, 2019

(86) PCT No.: PCT/EP2019/058889
§ 371 (c)(1),
(2) Date: Oct. 12, 2020

(87) PCT Pub. No.: WO2019/201663
PCT Pub. Date: Oct. 24, 2019

(65) Prior Publication Data
US 2021/0149358 A1 May 20, 2021

(30) Foreign Application Priority Data

Apr. 19, 2018 (DE) .................... 10 2018 109 307.1

(51) Int. Cl.
*G06F 3/00* (2006.01)
*G05B 19/042* (2006.01)
(Continued)

(52) U.S. Cl.
CPC ..... *G05B 19/0423* (2013.01); *G05B 19/0426* (2013.01); *G05B 19/4185* (2013.01); *G06F 13/14* (2013.01); *G05B 2219/25428* (2013.01)

(58) Field of Classification Search
CPC ...... G05B 19/0423; G05B 2219/25428; G05B 19/0426
See application file for complete search history.

(56) References Cited

U.S. PATENT DOCUMENTS

| 4,106,085 A * | 8/1978 | Demarest .................. H02J 3/36 363/51 |
| 2014/0129748 A1 | 5/2014 | Muth |

(Continued)

FOREIGN PATENT DOCUMENTS

| CN | 101815317 A | 8/2010 |
| CN | 102667783 A | 9/2012 |

(Continued)

OTHER PUBLICATIONS

Albert Book. "New, manufacturer-independent IO-Link interface for the intelligent process automation", Jan. 17, 2017 (Jan. 17, 2017), pp. 1-7, Retrieved from the Internet: https://www.keller.de/en/its/mediacenter/technical-reports.htm [retrieved on Jun. 5, 2019] XP055594175, the whole document & "Download—Technical Reports", Jun. 5, 2019 (Jun. 5, 2019), pp. 1-2, Retrieved from the Internet: https://www.keller.de/en/its/mediacenter/technical-reports.htm [retrieved on Jun. 5, 2019] XP055594179, p. 1.

(Continued)

*Primary Examiner* — Henry Tsai
*Assistant Examiner* — Kim T Huynh
(74) *Attorney, Agent, or Firm* — Harness, Dickey & Pierce, P.L.C.

(57) ABSTRACT

The disclosure relates to a communication system for automation and process engineering, having a controller as a signal receiver and a sensor as a signal source, which interchange voltage and/or current signals via a connection line, wherein the sensor is suitable for providing digital data according to the IO-Link standard, and the controller has only an analogue and/or switching signal input. In order to make it possible for the user to be able to easily access the (Continued)

data from an IO-Link-enabled sensor in the communication system if the control unit itself is not suitable for this purpose, the communication line is divided into two partial lines and a Y selector switch unit is used at the connection point, wherein a first connection is provided on the sensor side and a second and a third connection are provided on the controller side on the Y selector switch unit, wherein the controller is connected to the second connection and a further data receiver is connected to the third connection, and wherein the Y selector switch unit provides the further data receiver with the digital data according to the IO-Link standard from the sensor at the third connection and comprises an evaluation and processing unit which taps off the digital data according to the IO-Link standard from the sensor, extracts a binary switching signal therefrom and provides the controller with said signal at the second connection, with the result that the further data receiver can query the digital data from the sensor and can access the sensor without the signals between the sensor and the controller being influenced thereby.

9 Claims, 2 Drawing Sheets

(51) Int. Cl.
*G05B 19/418* (2006.01)
*G06F 13/14* (2006.01)

(56) References Cited

U.S. PATENT DOCUMENTS

| | | | |
|---|---|---|---|
| 2015/0095711 | A1* | 4/2015 | Elend .................. H04L 12/4135 714/39 |
| 2015/0381108 | A1* | 12/2015 | Höft ........................ H02S 50/00 361/91.1 |
| 2021/0149358 | A1* | 5/2021 | Wagner .............. G05B 19/0426 |

FOREIGN PATENT DOCUMENTS

| | | |
|---|---|---|
| DE | 202010002129 U1 | 6/2010 |
| DE | 102015223089 A1 | 5/2017 |
| DE | 102016221662 B4 | 7/2018 |
| EP | 3324579 A1 | 5/2018 |

OTHER PUBLICATIONS

Figure 3:
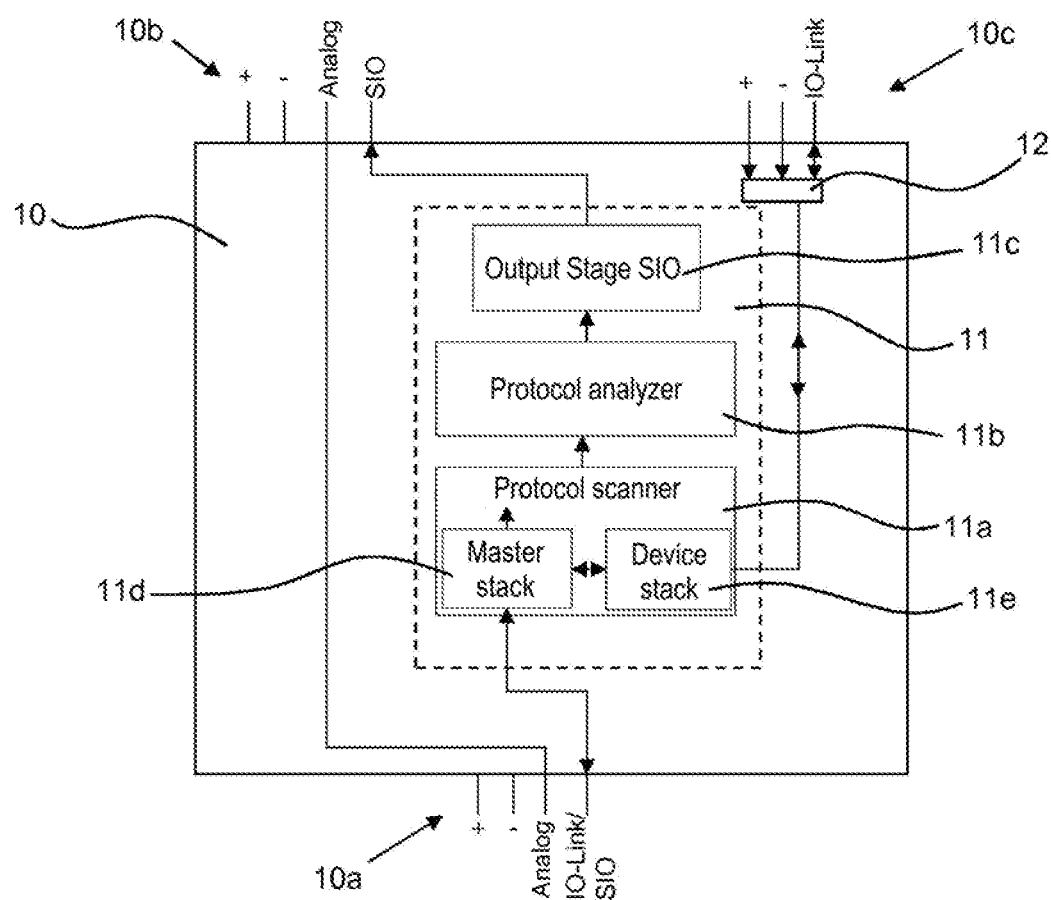

IO-Link, "IO-Link Interface and System (Version 1.1.2)", Jul. 1, 2013 (Jul. 1, 2013), pp. 1-262, Retrieved from the Internet: https://io-link.com/share/Downloads/Spec-Interface/IOL-Interface-Spec_10002_V112_Jul13.pdf [retrieved on Jun. 5, 2019] XP055594330, pp. 21, 33; figure 3.
Pepperl+Fuchs, "Quick Start Guide, WRM-F301-10-1315-2V15, SmartBridge Interface", Feb. 2016, pp. 1-39,.
Pepperl+Fuchs, "Handbook, WRM-F301-10-1315-2V15, SmartBridge Interface", Feb. 2016, pp. 1-27.
Book, Alert: Neue, herstellerunabhängige IO-Link Schnittstelle für die intelligente Prozessautomation. S. 1.-7, Jan. 2017.

* cited by examiner

COMMUNICATION SYSTEM FOR AUTOMATION AND PROCESS ENGINEERING, AND Y SELECTOR SWITCH UNIT FOR SUCH A COMMUNICATION SYSTEM

CROSS-REFERENCE TO RELATED APPLICATIONS

This application is a U.S. National Phase Application under 35 U.S.C. 371 of International Application No. PCT/EP2019/058889, filed on Apr. 9, 2019, which claims the benefit of German Patent Application No. 10 2018 109 307.1, filed on Apr. 19, 2018. The entire disclosures of the above applications are incorporated herein by reference.

FIELD

The disclosure relates to a communication system for automation and process engineering comprising a controller as a signal receiver and a sensor as a signal source, which interchange voltage and/or current signals via a connection line, and a Y selector switch unit for such a communication system.

BACKGROUND

This section provides background information related to the present disclosure which is not necessarily prior art.

In automation and process engineering, sensors or measuring devices are frequently used that convert the measured value—e.g. pressure, temperature, flow rate, and, moreover, distance or vibration—into an output signal representing this measured value in the form of an analog or digital current or voltage signal and provide this signal at their cable or plug connection, or sometimes wirelessly, for further processing to a higher-level controller, e.g. a PLC.

A typical measuring device first of all consists of a sensor element, also called "transducer" which is used to detect and convert a physical measured variable of a process value into a measurement signal. Furthermore, an evaluation unit is provided, which is often configured as a microcontroller and in which the measurement signals generated by the sensor element are conditioned, i.e. amplified, and mostly already processed. The output side of the evaluation unit is connected to an interface via which the processed measurement signals can be transmitted to the controller already mentioned in the form of binary switching signals or analog signals.

In addition, in automation engineering the use of a standard communication interface driver is known that complies with the IO-Link standard. The IO-Link standard is a special communication system of industrial automation which is used to connect intelligent sensors and actuators, which are also referred to as field devices, to the controller, provided the controller is IO-Link capable, i.e. is designed for such a communication. The IO-Link standard is standardized according to the IEC 61131-9 standard under the designation "Single-drop digital communication interface for small sensors and actuators" (SDCI). The standardization includes both electrical connection data as well as a digital communication protocol via which the sensors and actuators enter into data exchange with the IO-Link capable controller.

Nowadays, the vast majority of the sensors, in particular the sensors sold by the applicant, are IO-Link capable. On the other hand, the controllers used by users are often not IO-Link capable and only have an analog and/or switching signal input because there was simply no direct need for digital communication. Thus, the situation arises, that an intelligent, i.e. IO-Link capable, sensor is connected to a non-intelligent controller and thus significantly more data could be supplied by the sensor than are actually required by the higher-level controller in order to control the system in question.

In the Industry 4.0 context, however, there is now an increasing need to access the data from the intelligent sensor that the controller itself does not need in order to be able to monitor or evaluate this data without the need to change or replace the communication system set up between the controller and the sensor.

SUMMARY

This section provides a general summary of the disclosure, and is not a comprehensive disclosure of its full scope or all of its features.

The object of the disclosure is to develop the aforementioned communication system of automation and process engineering in such a way that it enables the user to easily access the data of an IO-Link capable sensor located in the communication system if the controller itself is not suitable therefore.

According to the disclosure, the communication line via which the controller at its analog or switching signal input and a sensor are connected to each other, is divided into two partial lines and a Y selector switch unit is inserted at the connection point. The term 'Y selector switch unit' results from the fact that a first connection is provided at the sensor side and a second and a third connection are provided at the controller side. The controller is connected to the second connection and a further data receiver is connected to the third connection.

On the one hand, the Y selector switch unit provides the digital data according to the IO-Link standard of the sensor at the third connection to the further data receiver. On the other hand, the Y selector unit comprises an evaluation and processing unit which, according to an advantageous implementation, comprises a scanning unit, a microcontroller and an amplifier unit. The evaluation and processing unit taps off the digital IO-Link data of the sensor, analyzes the protocol, extracts the original binary switching signal therefrom and finally provides it at the second connection of the controller. As a result, the additional data receiver can now query the digital data of the sensor without affecting the interface between the sensor and the controller. It is therefore crucial that the signals can be directly and unaltered be forwarded from the first connection to the third connection, i.e. from the sensor to the further data receiver, in the Y selector switch unit, i.e. be looped through, while the connection between the first and second connection, i.e. from the sensor to the control is characterized in that the signals are routed here in the Y selector switch unit via the evaluation and processing unit and there the binary switching signal is extracted from the digital IO-Link signal.

As a result, it is now possible for the user to access the digital communication data of an IO-Link capable sensor located in the communication system, while the non-intelligent controller unaffected by this can continue to receive the binary switching signals of the sensor.

An advantageous embodiment of the disclosure provides that the further data receiver comprises an interface for connection to a company network and/or a portable data processing device (tablet, smartphone, laptop, etc.). The connection can be wired, for example via LAN or USB, or wirelessly, for example via Bluetooth or WLAN. This enables the sensor data to be read out from the data receiver and processed further. The sensor data are then—independently of each other—available both in the control network and in a conventional company network or on mobile data processing devices, despite the strict separation of these two networks, which is often required.

Further areas of applicability will become apparent from the description provided herein. The description and specific examples in this summary are intend-ed for purposes of illustration only and are not intended to limit the scope of the pre-sent disclosure.

DRAWINGS

The drawings described herein are for illustrative purposes only of selected embodiments and not all possible implementations, and are not intended to limit the scope of the present disclosure.

In the following the disclosure is explained in more detail based on exemplary embodiments with reference to the drawings.

Figure 1:
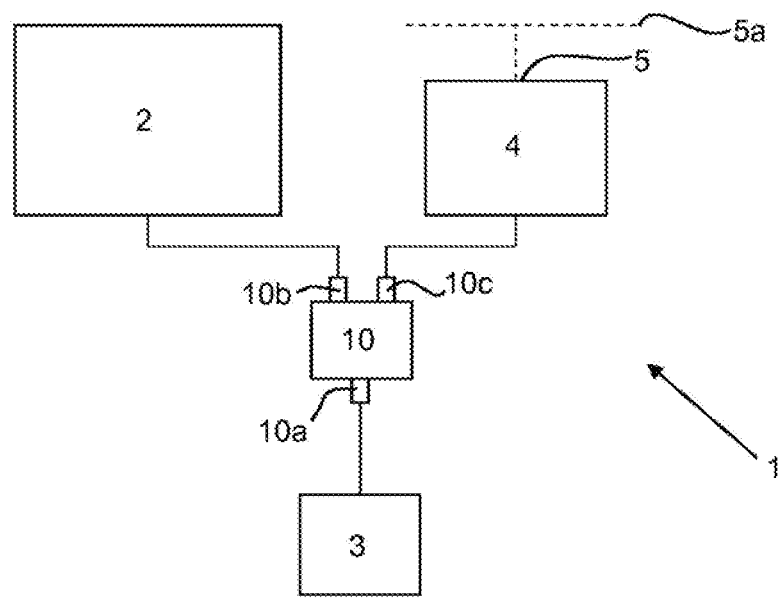
Figure 2:
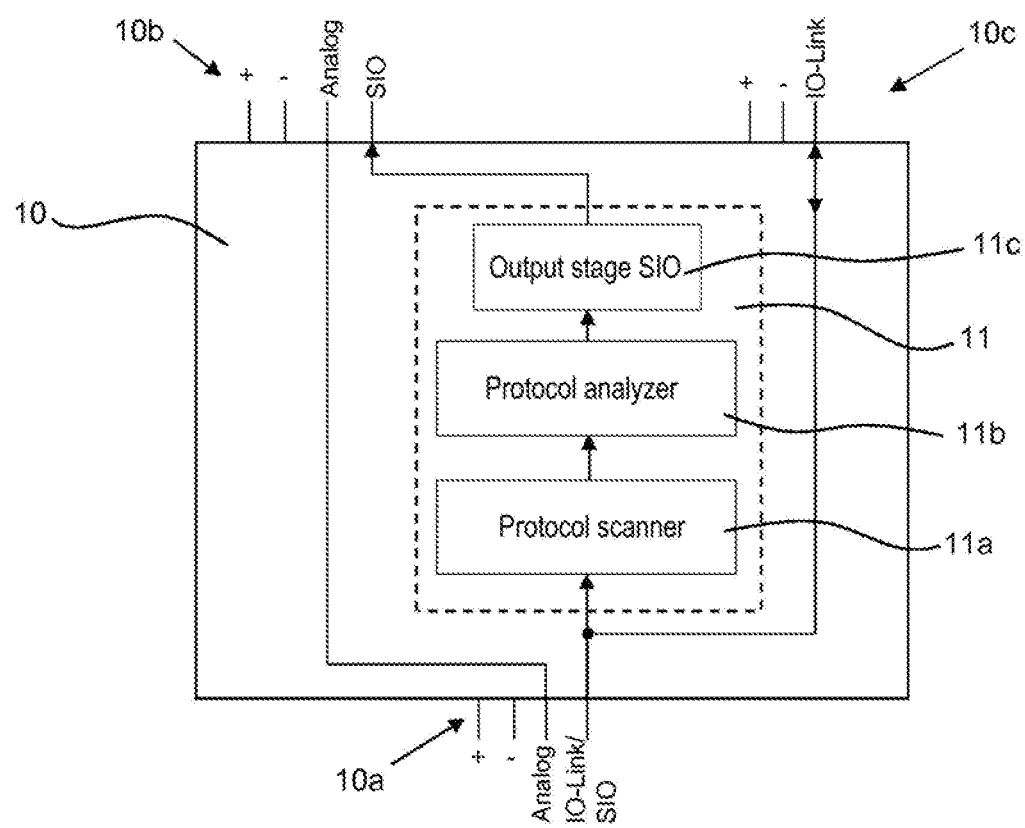

The drawings schematically show:

FIG. 1 a communication system for automation and process engineering according to the disclosure;

FIG. 2 a block diagram of a Y selector switch unit according to the disclosure; and FIG. 3 a block diagram of a further exemplary embodiment of a Y selector switch unit according to the disclosure of FIG. 2.

In the following description of the preferred embodiments, the same reference symbols designate the same or comparable components.

Corresponding reference numerals indicate corresponding parts throughout the several views of the drawings.

FIG. 1 schematically shows a communication system 1 according to the disclosure for automation and process engineering. The focus is on a Y selector switch unit 10 comprising three connections 10a, 10b, 10c, wherein a first connection 10a is arranged on the sensor side and the other two connections 10b, 10c are arranged on the controller side.

A sensor 3 is connected to the first connection 10a. This can be any type of sensor or measuring device that is commonly used in automation and process engineering, in particular a pressure, temperature, flow or level sensor. It is crucial that it is an intelligent sensor that is actually suitable for interchanging digital data with a controller, e.g. a PLC, according to the IO-Link standard. In addition to the pure measurement data, this primarily means data that characterize the sensor itself, such as a serial number, an identifier, diagnostic or parameter data. However, if the controller 2 only comprises an analog and/or switching signal input and is therefore not suitable for IO-Link communication, these additional data would remain unused because they cannot be retrieved or processed by the non-intelligent controller 2.

By inserting the Y selector switch unit 10 between the sensor 3 and the controller 2, the operator of such a communication system can now easily access this additional communication data from the sensor 3 for the purpose of monitoring or evaluation. The controller 2 is connected at the second connection 10b and the further data receiver 4 is connected at the third connection 10c to the Y selector switch unit 10. The data receiver 4 is in particular an IO-Link master.

It is conceivable to configure the connection between the Y selector switch unit 10 and the further data receiver 4 wireless, too, which results in a high degree of flexibility.

The data receiver 4 optionally, shown in dashed lines, comprises an interface 5 for connection to a company network 5a and/or a portable data processing device (tablet, smartphone, laptop, etc.). The connection can be wired, e.g. via LAN, USB, or wireless, e.g. via Bluetooth or WLAN. This makes it possible to read out the sensor data from the data receiver 4 and process them further. The sensor data are then—independently of one another—available both in the control network 2 and in a conventional company network 5a or on mobile data processing devices.

In FIG. 2, the Y selector switch unit 10 is shown in detail in the form of a block diagram. The three connections 10a, 10b, 10c each include four pins, wherein "+" and "−" respectively mean the positive and negative operating voltage. In order not to overload the figure, the explicit wiring of these pins was omitted and the connection options are only indicated. There is also a respective pin for tapping off the recorded measured values, here as an example in form of an analog signal, as well as a pin via which digital signals according to the IO-Link standard or binary switching signals (SIO: Serial Input Output) are transmitted. The analog signal is looped through and is only shown here as an option; the main focus is on the fourth pin, via which the digital or binary signal is transmitted.

As can be seen from FIG. 2, the line for the IO-Link signal is split and, on the one hand, is fed directly to the third connection 10c at which the data receiver 4 is connected, and on the other hand to the second connection 10b to which the controller 2 is connected, wherein the IO-Link signal is previously fed to an evaluation and processing unit 11 which comprises a protocol scanner 11a, a protocol analyzer 11b and an amplifier unit 11c.

The protocol scanner 11a is preferably implemented as a hardware circuit and scans the digital IO-Link signal that is provided at the sensor connection 10a and feeds it to the protocol analyzer 11b. The protocol analyzer 11b is implemented as a microcontroller with an integrated IO-Link stack which is used to interprete the protocol in order to filter out the switching information included therein. The amplifier unit 11c is preferably again implemented as a hardware circuit and is used to condition the switching signals in the form understandable for the controller 2. The conditioned switching signal is then provided to the controller 2 at the second connection 10b.

The connection between the first connection 10a and the third connection 10c, to which the data receiver 4 is connected, is characterized as a bidirectional communication line by the two oppositely directed arrows. I.e., it is also possible for the IO-Link master as the further data receiver 4 to access the sensor 3 and to carry out there, for example, a parameterization. On the connections between the first connection 10a and the second connection 10b only a respective one signal transmission from the sensor 3 to the controller 2 is possible.

While the Y selector switch unit 10 is shown in its basic structure in FIG. 2, FIG. 3 shows the Y selector switch unit 10 in somewhat more detail and with some advantageous implementations. The protocol scanner 11a also includes a master stack 11d and a device stack 11e, which are basically already included in FIG. 2, but are not mentioned there for reasons of illustration. The master stack 11d provides the sensor 3 at the first connection 10a with a Master, while the device stack 11e provides the data receiver 4 at the third connection 10c with a Device, i.e. a sensor is specified.

A first difference to FIG. 2 is that the IO-Link signals between the first connection 10a and the third connection 10c are now routed via the evaluation and processing unit 11, i.e. first via the master stack 11d and then via the device stack 11e. By doing so, the functionality of the Y selector switch unit 10 is further improved, regardless of whether a further data receiver is connected to the third connection 10c or not.

Another difference to the embodiment according to FIG. 2 is that the third connection 10c is completely galvanically isolated from the rest of the Y selector switch unit 10. As a unit for this galvanic separation 12 in particular an optocoupler lends itself. This measure can effectively eliminate any cross-currents that may occur.

It is also advantageous to integrate a write protection into the communication line between master stack 11d and device stack 11e in order to prevent an unwanted write access of the data receiver 4 to the sensor 3 and thereby, for example, to allow the parameterization of the sensor 3 only in certain situations.

The foregoing description of the embodiments has been provided for purposes of illustration and description. It is not intended to be exhaustive or to limit the disclosure. Individual elements or features of a particular embodiment are gen-erally not limited to that particular embodiment, but, where applicable, are inter-changeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A communication system of automation and process engineering comprising a controller as a signal receiver and a sensor as a signal source, which interchange voltage and/or current signals via a connection line,
   wherein the sensor is suitable for providing digital data according to an IO-Link standard and the controller comprises only an analog and/or switching signal input, wherein the connection line is divided into two partial lines and a Y selector switch unit is inserted at the connection point,
   wherein at the Y selector switch unit a first connection is provided at the sensor side and a second and a third connection are provided at the controller side,
   wherein the controller is connected to the second connection and a further data receiver is connected to the third connection, and
   wherein the Y selector switch unit on the one hand provides the digital data according to the IO-Link standard of the sensor at the third connection to the further data receiver and on the other hand comprises an evaluation and processing unit that taps off the digital data according to the IO-Link standard of the sensor, extracts a binary switching signal therefrom and provides it to the controller at the second connection so that the further data receiver can query the digital data of the sensor and access the sensor without the signals between the sensor and the controller being influenced thereby.

2. The communication system according to claim 1, wherein the evaluation and processing unit comprises a scanning unit, a microcontroller and an amplifier unit.

3. The communication system according to claim 2, wherein the microcontroller comprises a protocol analyzer and a protocol stack according to the IO-Link standard.

4. The communication system according to claim 1, wherein the data and signals from or to the third connection are routed via a galvanic isolation.

5. The communication system according to claim 1, wherein the further data receiver comprises an interface for connection to a company network and/or a portable data processing device.

6. A Y selector switch unit for a communication system of automation and process engineering, comprising a controller as a signal receiver and a sensor as a signal source,
   wherein voltage and/or current signals are interchanged via a connection line and the sensor is suitable for providing digital data according to an IO-Link standard and the controller has only an analog and/or switching signal input,
   wherein a first connection is provided at the sensor side and a second and a third connection are provided at the controller side,
   wherein the second connection is provided for connection to the controller and the third connection is provided for connection to a further data receiver, and
   wherein the Y selector switch unit on the one hand provides the digital data according to the IO-Link standard of the sensor at the third connection to the further data receiver and, on the other hand comprises an evaluation and processing unit that taps off the digital data according to the IO-Link standard of the sensor, extracts a binary switching signal therefrom and provides it to the controller at the second connection so that the further data receiver can query the digital data of the sensor and can access the sensor without the signals between the sensor and the controller being influenced thereby.

7. The Y selector switch unit according to claim 6, wherein the evaluation and processing unit comprises a scanning unit, a microcontroller and an amplifier unit.

8. The Y selector switch unit according to claim 7, wherein the microcontroller comprises a protocol analyzer and a protocol stack according to the IO-Link standard.

9. The Y selector switch unit according to claim 6, wherein the data and signals from or to the third connection are routed via a galvanic isolation.

* * * * *